Figure 4:
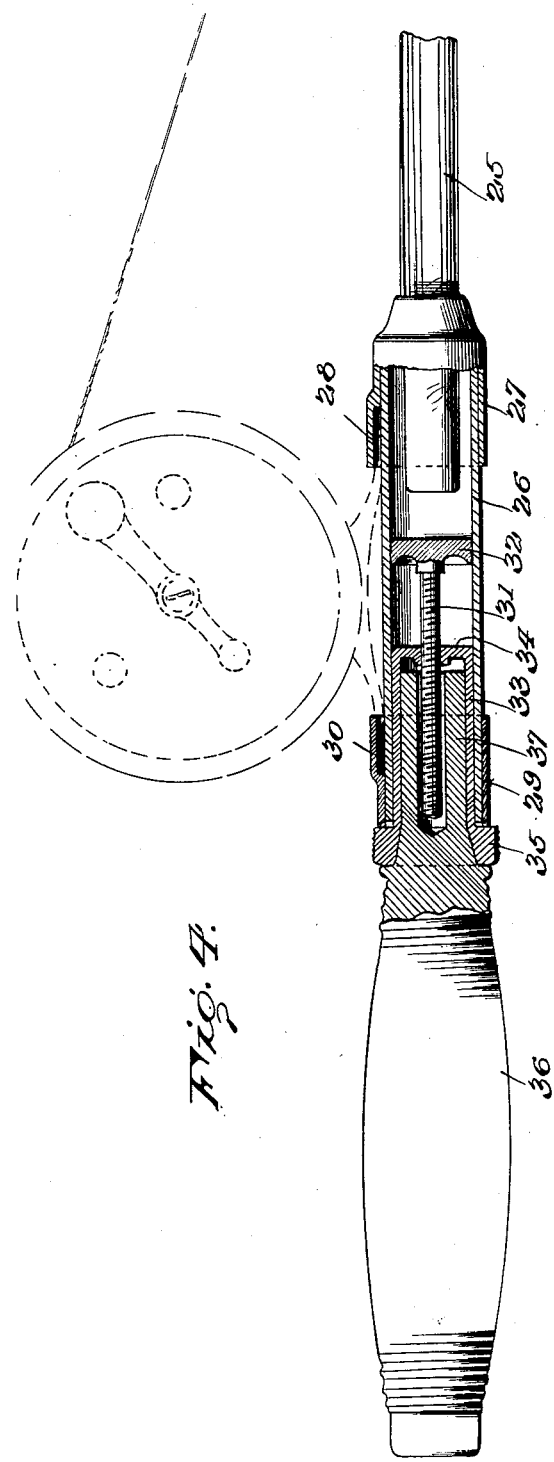

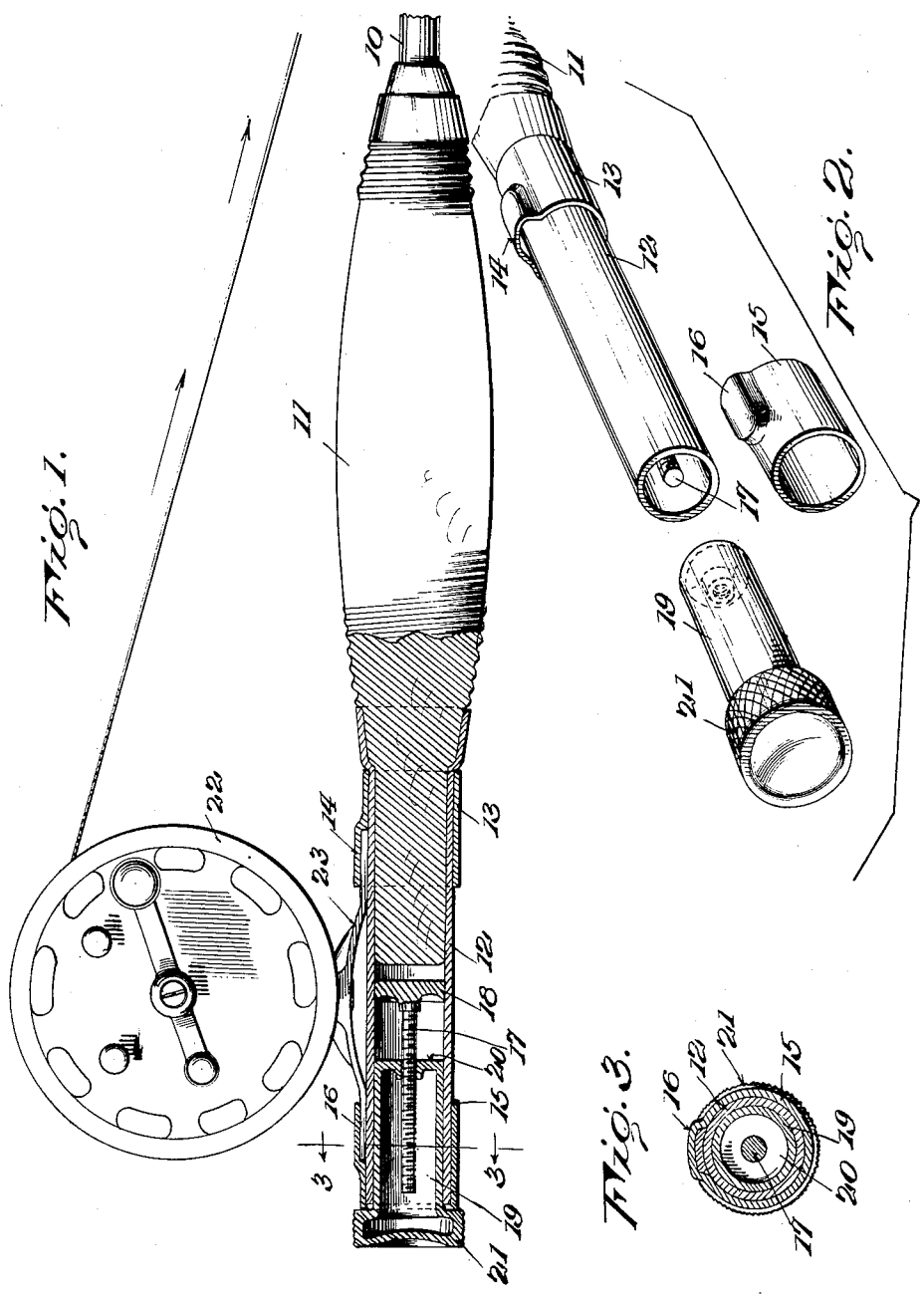

W. L. BEATY.
REEL SEAT FOR FISHING RODS.
APPLICATION FILED NOV. 26, 1919.

1,350,637.

Patented Aug. 24, 1920.
2 SHEETS—SHEET 2.

Inventor.
W. L. Beaty.
by Lacey & Lacey, Attys.

UNITED STATES PATENT OFFICE.

WILBUR L. BEATY, OF SOUTH BUTTE, MONTANA.

REEL-SEAT FOR FISHING-RODS.

1,350,637.

Specification of Letters Patent.

Patented Aug. 24, 1920.

Application filed November 26, 1919. Serial No. 340,786.

*To all whom it may concern:*

Be it known that I, WILBUR L. BEATY, a citizen of the United States, residing at South Butte, in the county of Silver Bow and State of Montana, have invented certain new and useful Improvements in Reel-Seats for Fishing-Rods, of which the following is a specification.

This invention relates to an improved reel seat for fishing rods and has as one of its principal objects to provide a reel seat wherein the reel may be securely fastened thereon but wherein the reel may, when desired, be readily removed from the seat.

A further object of the invention is to provide a reel seat having means adjustable for clamping the reel upon the seat and wherein the seat will be adapted to accommodate reels of different sizes.

And the invention has as a still further object to provide a reel seat which will be light in weight and which may be economically produced.

Other and incidental objects will appear hereinafter.

Figure 5:
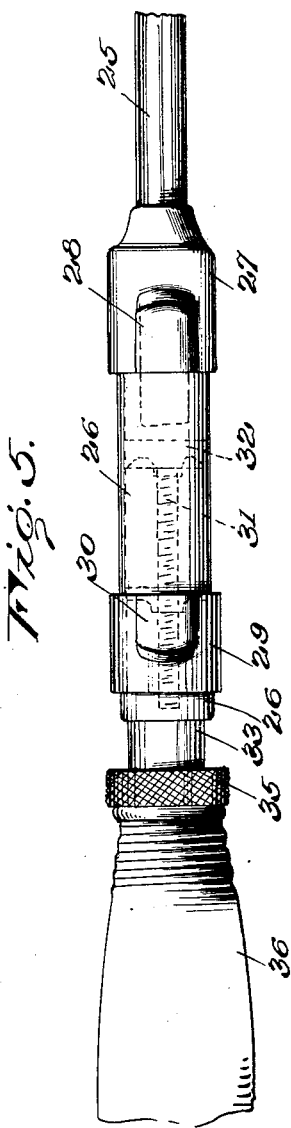

In the drawings:

Figure 1 is a side elevation partly broken away and shown in section, this view illustrating my improved reel seat mounted at the rear or outer end of the handle of a conventional type of fishing rod, an ordinary reel being shown in position upon the seat, Fig. 2 is a disassembled perspective view of the reel seat, Fig. 3 is a transverse sectional view taken on the line 3—3 of Fig. 1 and looking in the direction of the arrows, Fig. 4 is a view similar to Fig. 1 showing a slightly modified form of reel seat constructed to be mounted in advance of the handle of a fishing rod, the fishing rod and reel being conventionally illustrated, and Fig. 5 is a fragmentary plan view of the modified structure shown in Fig. 4.

Referring now more particularly to Figs. 1, 2 and 3 of the drawings, I have shown my improved reel seat in connection with a conventional type of fishing rod 10 having a handle 11. In carrying out the present invention I employ a barrel 12 fitted at its inner end portion over the rear end portion of the handle, the handle being shown as provided with a reduced extension received within the barrel. Suitably fixed upon the barrel at its inner end is a sleeve 13 provided at the upper side of the barrel with a reel base receiving socket 14. Slidable upon the outer end portion of the barrel is a sleeve 15 also provided with a reel base engaging socket 16 corresponding to the socket 14. Fixed within the outer end portion of the barrel is a threaded stud 17 lying axially of the barrel and provided at its inner end with an annular head 18. This head may be secured within the barrel in any approved manner so that the stud will be rigidly supported thereby. Adjustable within the outer end portion of the barrel is a follower 19. This follower may, as shown in the drawings, be formed with a hollow shank adapted to freely fit within the barrel and closed at its inner end by an end wall 20 through which is formed an axial threaded aperture for receiving the stud 17. Integrally formed on or otherwise mounted upon the follower shank at its outer end is a head 21 overhanging the barrel and adapted to coact with the sleeve 15. This head is preferably milled so that the follower may be readily rotated.

In Fig. 1 of the drawings, I have shown a reel 22 of conventional type in position upon my improved reel seat, this reel being provided with the usual reel base 23. In mounting the reel upon the seat one end portion of the reel base is first engaged within the socket 14 of the sleeve 13 when the sleeve 15 may then be manually shifted to initially engage the socket 16 over the opposite end portion of the reel base. Then, by properly rotating the follower 19, this follower may be adjustably advanced for advancing the sleeve 15 and consequently tightly binding the reel upon the reel seat. As will be seen, the reel will be securely held against accidental displacement while, when desired, the reel may be readily removed by simply counter-rotating the follower.

In Figs. 4 and 5 of the drawings, I have shown a slight modification of the invention wherein the reel seat is so constructed that it may be mounted in advance of the handle of a fishing rod. In these figures, a fishing rod is conventionally illustrated at 25. Suitably secured at its inner end portion to the fishing rod is a barrel 26 at the inner end of which is fixed a sleeve 27 having a socket 28. Slidable upon the outer end portion of the barrel is a sleeve 29 having a socket 30 and mounted within the outer end portion of the barrel is an axial stud 31 provided at its inner end with a head 32 fixed within the barrel. All of these parts respectively correspond to similar parts of the preferred construction and coöperate in like manner. Adjustable within the outer end portion of the barrel is a follower 33 provided with a hollow shank freely received within the barrel and closed at its inner end by an end wall 34 through which is formed a threaded aperture receiving the stud 31. At the outer end of the shank is formed a head 35 overhanging the barrel to coact with the sleeve 29. Consequently, by properly rotating the follower this follower may be adjusted for advancing the sleeve, as in the preferred construction, and, if desired, the head 35 of the follower may be milled. In this modification, the follower is mounted upon the inner end of a handle 36 for the fishing rod. This handle may be of any approved character and is provided with a reduced inner end portion 37 fitting through the head of the follower snugly within the shank thereof and any approved means may be employed for positively connecting the follower with the handle. As will be observed, the reduced inner end portion of the handle is axially bored to freely receive the stud 31, and, of course, as will now be clear, the handle itself may be rotated for adjusting the follower.

Having thus described the invention, what is claimed as new is:

1. A reel seat including a barrel, reel base engaging means carried thereby, a reel base engaging sleeve slidable upon the barrel, a follower received within the barrel and adapted to coact with the sleeve, means mounted within the barrel to coact with the follower whereby the follower may be adjusted for advancing the sleeve, and an elongated handle carried by the follower and adapted to be grasped for manipulating a rod connected to the seat.

2. A reel seat including a barrel, reel base engaging means carried thereby, a reel base engaging sleeve slidable upon the barrel, a follower received within the barrel and adapted to coact with said sleeve, and fixed means housed within the barrel to extend axially thereof and engaged exteriorly by the follower whereby the follower may be adjusted for advancing said sleeve.

3. A reel seat including a barrel, reel base engaging means carried thereby, a reel base engaging sleeve slidable upon the barrel, a follower received within the barrel and adapted to coact with said sleeve, and a stationary threaded stud housed within the barrel to coact with the follower whereby the follower may be adjusted for advancing said sleeve.

4. A reel seat including a barrel, reel base engaging means carried thereby, a reel base engaging sleeve slidable upon the barrel, a stationary threaded stud housed within the barrel, and a follower having a hollow shank provided with an end wall receiving the stud therethrough and coacting with the stud whereby the follower may be adjusted for advancing said sleeve.

5. A reel seat including a barrel, reel base engaging means carried thereby, a reel base engaging sleeve slidable upon the barrel, a hollow follower fitting within the barrel and adapted to coact with said sleeve, a handle having its inner end portion fixed within the follower, and means mounted within the barrel to coact with the follower whereby the handle may be turned for adjusting the follower to advance said sleeve.

6. A reel seat including a barrel, reel base engaging means carried thereby, a reel base engaging sleeve slidable upon the barrel, a follower received within the barrel to coact with the sleeve, means mounted within the barrel to coact with the follower whereby the follower may be adjusted for advancing the sleeve, the sleeve being loose with respect to the follower whereby the sleeve may be positioned toward or away from the said first mentioned means independently of the follower, and a handle carried by the follower.

7. A reel seat including a barrel, a head fixed therein and having a stationary stud extending axially of the barrel, reel base engaging means carried by the barrel, a reel base engaging sleeve slidable upon the barrel, and a follower received within the barrel to engage said stud and coact with the sleeve whereby the follower may be adjusted for advancing the sleeve.

8. A reel seat including a barrel, reel base engaging means carried thereby, a reel base engaging sleeve slidable upon the barrel, a hollow follower received within the barrel and provided at its outer end with a head coacting with said sleeve, means mounted within the barrel to coact with the follower whereby the follower may be adjusted for advancing the sleeve, and a handle fitted in the follower and supported thereby.

In testimony whereof I affix my signature.

WILBUR L. BEATY. [L. S.]